United States Patent [19]

Todd, Jr. et al.

[11] 4,315,947

[45] Feb. 16, 1982

[54] LIQUID SEASONING COMPOSITIONS II

[75] Inventors: Paul H. Todd, Jr.; Howard E. Haley, both of Kalamazoo, Mich.

[73] Assignee: KALSEC, Inc., Kalamazoo, Mich.

[21] Appl. No.: 125,424

[22] Filed: Feb. 28, 1980

[51] Int. Cl.$^3$ ............................................. A23L 1/27
[52] U.S. Cl. ................................... 426/250; 426/534; 426/540; 426/590; 426/650; 426/651; 426/654
[58] Field of Search ............... 426/651, 650, 250, 540, 426/654, 590–592, 626, 534

[56] References Cited

U.S. PATENT DOCUMENTS

| | | | |
|---|---|---|---|
| 2,508,978 | 5/1950 | Tribble | 426/651 |
| 2,626,218 | 1/1953 | Johnstone | 426/651 |
| 2,860,054 | 11/1958 | Yanick | 426/651 |
| 3,764,346 | 10/1973 | Noznick et al. | 426/651 |
| 3,906,116 | 9/1975 | Quesnel | 426/651 |
| 3,988,512 | 10/1976 | Johnson | 426/651 |
| 4,093,750 | 6/1978 | Babayan | 426/250 |

*Primary Examiner*—Jeanette M. Hunter

*Attorney, Agent, or Firm*—Gordon W. Hueschen

[57] ABSTRACT

A homogeneous liquid condimental composition, useful in flavoring or coloring foods and beverages, which is dispersible in brine or syrup with development of a haze, but which upon standing becomes a part of the flavoring or coloring of a food substrate, when present in said brine or syrup, with resulting clearing of said brine or syrup, containing (1) at least one condiment selected from an edible flavoring and an edible coloring and (2) a polyglycerol ester of a fatty acid, said polyglycerol having at least three glycerol units, preferably at least six glycerol units, the weight ratio of (2) to (1) in the said composition being at least 0.7:1; preferably at least 1:1; most usually between about 2:1 and 10:1; especially such compositions wherein the condiment is selected from oleoresin turmeric, curcumin, bixin, and norbixin, but also such compositions wherein the condiment is or includes an edible flavoring; such compositions wherein propylene glycol is included as a diluent; and foods or beverages seasoned, flavored, or colored with such condimental compositions, are disclosed.

57 Claims, No Drawings

LIQUID SEASONING COMPOSITIONS II

FIELD OF INVENTION

Liquid condimental compositions; food and beverage flavoring and coloring compositions; coloring and seasoning compositions for brines and syrups; seasoning and coloring of pickles; flavoring and coloring of beverages.

PRIOR ART

In our separate water and oil dispersible flavoring ("w/o flavor") composition copending applications Ser. Nos. 125,423 and 125,425, filed even date herewith, condimental mixtures which are dispersible in both water and oil are described. Such compositions are suitable for applications in which, if a water dispersion is to be made, ultimate clarity is not a requirement. However, when they are used to flavor a brined food or a food covered with a syrup, the stability of those dispersions is reduced and they will tend to float out and perhaps spot the food to be flavored or colored.

The prior art set forth in our said copending applications, particularly that represented by U.S. Pat. Nos. 2,860,054, 2,680,690, and 2,626,218, or by use of Polysorbate 80 USP as emulsifying agent, or spray drying, are all subject to the same limitations, to a greater or lesser degree, depending upon the concentration of the brine or syrup and the substrate to be flavored.

The "w/o flavor" system of our copending applications, being designed as it is to provide a universal condimental system dispersible in both oil and water, uses substantial amounts of dispersing agents which tend to agglomerate and float out too readily to be universally useful in brines and syrups. They are designed to solve a different problem and tailored for a different application.

According to present practice of the art, the following techniques are used to flavor and color brines and syrups.

(a) Using pickles as an example, the principal procedure for spicing pickles is by the employment of seasonings dissolved in one, and preferably two or more, parts of Polysorbate 80 USP, a very powerful emulsifier. Flavored brines usually are acceptably stable due to the fine emulsion formed. Exceptions to this stability occur either with employment of substantial amounts of fats or an increase in brine concentration. Foaming is a problem during mixing, due to the Polysorbate 80. Upon pasteurization and standing, some of the flavor and color (if turmeric or curcumin is used), is absorbed by the pickle, but a significant portion remains in the brine, emulsified by Polysorbate 80, thus being lost to the food.

(b) Since Polysorbate 80 USP contributes a soapy flavor, and since such compositions are unstable once the pickle jar has been opened, with concurrent development or rancidity, finer quality flavors can be made by infusing the cover brine with spices, whole or ground, which are added directly to the jar. This is an inefficient and costly process, and does not work well for some spices, such as turmeric. When pickles are to be colored with turmeric, Polysorbate 80 is always used as a means of incorporating the turmeric into the brine as a clear emulsion. Therefore, to avoid the soapy flavor or Polysorbate 80, a "coal-tar" yellow dye is often used in place of turmeric.

(c) Dispersions of spice oleoresins on salt or dextrose are also added to the brines as a means of avoiding Polysorbate 80. The spicing tends to float out and, in the case of turmeric, the float-out is so severe that the pickles are unevenly colored, so that oleoresin turmeric cannot be used in this manner. The dispersions themselves are unstable, due to oxidation of the dispersed flavoring.

A summary of the advantages and disadvantages of these systems in brines and syrups is provided in Table I.

It is apparent from the foregoing that improved, economic, efficient, and more universally utilizable food and beverage flavoring, seasoning, and/or coloring systems, which are not characterized by inherent shortcomings and deficiencies of available prior art systems, would be highly desirable and would fulfill a long-felt need in the art. Such systems are provided by the present invention.

OBJECTS OF THE INVENTION

This invention has the following objects, inter alia:

To provide a liquid flavoring system suitable for use in brines and syrups. To provide a liquid flavoring system suitable for use in pickles. To provide a liquid flavoring system which does not utilize Polysorbate 80. To provide a means of coloring pickles with turmeric without using Polysorbate 80. To provide a seasoning system which reduces costs by fully utilizing the spice flavors and colors. To provide a seasoning system which has no effect on the food other than to season and color. To provide a seasoning system which will not contribute off-flavors to brined or syruped foods, particularly after the container is opened. To provide a seasoning system with reduced foaming. To provide a seasoning and coloring system for use in beverages and juices. Still other objects will be apparent to one skilled in the art, and additional objects will become apparent hereinafter.

The foregoing and additional objectives are achieved by provision of the flavoring, seasoning, or coloring compositions of the present invention, and the foods and beverages flavored, seasoned, or colored therewith.

GLOSSARY OF TERMS

The following identification of terms will allow the reader to better understand the specific technical aspects of this invention:

Spices and Herbs

Aromatic and/or colored edible vegetable substances, the significant function of which is seasoning food. These are edible flavors or seasonings.

Oleoresin

Spice oleoresins are derived from spices and contain the sapid, odorous, and related characterizing principles of the spice. They are produced by the solvent extraction of a ground spice, with subsequent solvent removal and occasionally purifying steps to remove unwanted components, such as waxes and chlorophyll. Also an edible flavor or seasoning.

Essential Oil

The volatile oil obtained from the plants (spices and herbs). This oil usually has the characteristic (essential) odor and flavor of the spice. It is most commonly steam distilled from the spice. Another edible flavor or seasoning.

Condiment

A substance, or mixture of substances, the effect of which in a food or beverage is seasoning, flavoring and/or coloring, and which is soluble in a solvent or volatile with steam. Encompasses edible flavors or seasonings and edible colorings.

Polysorbate 80

Polysorbate 80 USP is a partial ester, non-ionic, surface-active emulsifying agent produced by condensing ethylene oxide with sorbitan monooleate in a mole ratio of about 20:1, the latter being prepared by reacting refined sorbitol with refined oleic acid.

Polyglycerol Esters of Fatty Acids

Polyglycerol partial esters of edible fats and/or their fatty acids, up to and including the decaglycerol esters. Usually produced by first polymerizing glycerine to form a molecule from diglycerol to decaglycerol in length, then esterifying with selected fatty acid materials this polymerized glycerine or polyol. For some purposes, such materials having at least three, and preferably at least six, glycerol moieties are required. For other purposes, this is not a requirement or a limitation. Hereinafter sometimes abbreviated "polyglycerol esters" or merely "esters".

Brine and Syrup

Water or vinegar containing one percent or more salt and/or sugar (weight per volume) as commonly used in pickles and beverages and less frequently in other food applications.

Lecithin

Usual definition. Phosphatides and phospholipides, usually obtained as by-products of the extraction of soy bean oil.

Hydroxylated Lecithin

Usual definition. A waxy mixture of phosphatides, usually obtained from soybeans, hydroxylated to add hydroxyl (OH) groups.

Tartaric Acid Esters of Mono- and diglycerides

Obtained by esterification reaction of tartaric acid, and usually also acetic acid, with a distilled monoglyceride, commonly referred to as data esters and widely used as a dough conditioner. Usually contains one or more acetate moieties in addition to the tartarate moiety, although this is not essential. Usually some very small percentage of triglyceride is also present.

"w/o Flavor"

An abbreviation for "water and oil dispersible flavor" used herein to designate a water and oil dispersible condimental liquid system which is an object of our invention, described in the specification and examples, and claimed in the claims of our applications Ser. Nos. 125,423 and 125,425 filed Feb. 28, 1981.

"Consisting Essentially of"

According to established practice, this phrase means that the necessary stated ingredients are present in the necessary stated amounts, but that the presence of other ingredients or additaments which do not interfere with attainment of the objectives of the invention is not precluded. In this sense, it is to be noted that diluting and/or standardizing agents, such as vegetable oils, propylene glycol, lactic acid, ethanol, mono- and diglycerides and esters thereof, lecithin, hydroxylated lecithin, sorbitan fatty acid esters, etc., are not excluded to the extent that they do not interfere with attainment of the objectives of the invention.

Foods and beverages

The usual solid or liquid foods and the usual beverages including juices, as well as candies, gums, sweetmeats, medicines, including mouthwashes and gargles, and like ingestible or orallyacceptable materials, including all other types of drinkables and chewables.

Edible Colorings

Any pigment or other coloring which is ingestible or orally acceptable and which, like all flavorings or seasonings, are preferably but not necessarily "generally recognized as safe" (GRAS). Many are disclosed hereinafter.

Materials Employed

Lecithin

Central Soya Commercial Lecithin having as representative composition: phosphatidyl choline 20%, phosphatidyl ethanolamine 20%, inositol phosphatides 21.5%, soybean oil 34%, misc. (sugars, sterols, moisture, etc.) 4.5%.

Hydroxylated Lecithin

Central Soya "CentroleneA"(TM) for its brand of hydroxylated lecithin, having a composition approximately as follows: acetone insolubles 60%, moisture 2%, benzene insolubles 0.1%, other lipids 35%.

Panodan SD (TM) for Grinsted Products, Inc. brand of GRAS FDA-approved diacetyl tartaric acid ester of monodiglycerides. Saponification value 400–420; acid value 62–76; iodine value 75–85; color yellow; clear mp. ca. 35° C./95° F.; form-semiliquid; antioxidant added: phosphoric acid max 200 ppm; BHA max 200 ppm. Panodan FD (TM) and Panodan (235 (TM) are also suitable for use instead of SD.

Polysorbate 80

USP specifications. Usually ICI Tween 80 (TM) brand.

Sorbitan Monooleate and Trioleate

Mazer Chemicals, Inc. S-MAZ 80 (TM) brand; sap. no. 149–160, hydroxy no. 193–209; amber liquid. The corresponding ICI sorbitan monooleate product is Span 60 (TM). S-MAZ 80 (TM) is the corresponding trioleate having a sap. no. of 172–186 and hydroxy no. of 56–68. The corresponding ICI sorbitan trioleate product is Span 85 (TM).

Sorbitan Fatty Acid Esters

Mazer Chemicals, Inc. S-MAZ (TM) brand are suitable; series 20 through 90 are various nonionic lipophilic fatty acid esters having varying degrees of surfactant activity.

Polyglycerol Fatty Acid Esters

Triglycerol monostearate—Santone 31S (TM) brand by Durkee, Inc. Division of SCM, Mazol PGS-31 (TM) of Mazer Chemicals;

Triglycerol monooleate—Mazol PGO-31 (TM) of Mazer Chemicals, Inc.; Octaglycerol monooleate—Santone 8-1-O (TM) brand by Durkee, Inc.; Octaglycerol monostearate—Santone 8-1-S (TM) brand by Durkee, Inc.

Decaglycerol monocaprylate—caproate—Drewmulse 10-1-CC (TM) of PVO International, Inc. for its brand of decaglycerol ester of caprylic and capric acids. Sapon. no. 85-105; acid no. 3 max.; hydroxyl no. 610-660.

SUMMARY OF THE INVENTION

The present invention relates, inter alia, to a homogeneous liquid condimental composition, useful in flavoring or coloring foods and beverages, which is dispersible in brine or syrup with development of a haze, but which upon standing becomes a part of the flavoring or coloring of a food substrate, when present in said brine or syrup, with resulting clearing of said brine or syrup, consisting essentially of (1) at least one condiment selected from an edible flavoring and an edible coloring and (2) a polyglycerol ester of a fatty acid, said polyglycerol having at least three and preferably at least six glycerol units, the weight ratio of (2) to (1) in the said composition being at least 0.7:1; preferably at least 1:1, most usually between about 2:1 and 10:1; such compositions wherein the condiment is selected from oleoresin turmeric, curcumin, bixin, and norbixin; such compositions wherein the condiment is oleoresin turmeric and the weight ratio of (2) to (1) is at least about 1:1; such compositions wherein the condiment is curcumic and the weight ratio of (2) to (1) is at least about 4:1; such compositions wherein the condiment also includes an edible flavoring; such compositions wherein the edible coloring is selected from the group consisting of annatto extract, bixin, norbixin, lycopene, capsanthin, beta-apo-8 carotenal, and beta-carotene; such compositions wherein the condiment also includes or is an edible flavoring; such compositions wherein the edible flavoring is a spice oleoresin or an essential oil; such compositions wherein the edible flavoring is selected from the group consisting of dill, garlic, ginger, clove, bay, pimento, cassia, caraway, capsicum, celery, coriander, nutmeg, paprika, black pepper, mustard, marjoram, thyme, sage, basil, spearmint, peppermint, lemon oil, orange oil, and tarragon; such compositions wherein propylene glycol is included as a diluent; and foods or beverages seasoned, flavored, or colored with such a condimental composition.

GENERAL DESCRIPTION AND MAJOR ASPECTS OF THE INVENTION

Inter alia, the present invention provides:
1. A composition of a polyglycerol mono-ester of a fatty acid and the colorings and flavorings common to brined and syruped foods, which forms dispersions in brines and syrups, which clear upon standing with transfer of the seasoning and coloring to the brined or syruped food.
2. A mixture of turmeric oleoresin in a polyglycerol of a fatty acid which forms stable dispersions when mixed with brines.
3. The polyglycerol should have three or more, preferably at least six, and most preferably eight or more glyceride linkages, and is preferably an ester primarily of shorter chain or unsaturated fatty acids. It should be present in at least about one part to one part of turmeric oleoresin.
4. The composition of (1) is compatible with flavorings made according to our "w/o flavor" inventions, and with essential oils, such as oil of dillweed.
5. The compositions especially of (3), are compatible with propylene glycol as a diluting agent.
6. For pickles, the flavoring-coloring is dispersed by mixing with a brine, the brine is used to fill the pickle jar in a normal manner, the jar closed, pasteurized, and treated normally thereafter. All of the flavoring and coloring is ultimately absorbed by the pickle, since it is not held in the brine as an emulsion.
7. Pickles can be uniformly flavored and colored using a mixture of polyglycerols of fatty acids, turmeric oleoresin, and spice oleoresins and essential oils.
8. Beverages and juices can be uniformly flavored and colored using the mixture of (1).

CRITICAL ASPECTS AND LIMITATIONS OF THIS INVENTION

1. The polyglycerol must have at least three, preferably at least six, and most preferably eight or more glyceride linkages.
2. The polyglycerol should be present in an amount exceeding about 70% and preferably at least about 100%, of the oleoresin turmeric and/or other flavoring and coloring.
3. If oleoresins in the spicing system contain large amounts of fats, they cannot be present at levels of more than about 10% of the flavoring, or the fats will separate.
4. If high salt brines or high sugar syrups are used, the pickles or other foods are desirably pasteurized shortly after killing to achieve the most uniform color and flavor penetration.
5. The flavorings are not dispersible in vegetable oils as are the "w/o flavors".

UNEXPECTED RESULTS

Inter alia:
1. Although the seasoned brines are objectionably cloudy initially, upon pasteurization and standing, they clear up and the coloring and flavoring are uniformly distributed on and into the pickle, or other food. For example, pickles are colored throughout, not just on the surface.
2. In beverages and juices, spice oleoresins and essential oils, although being substantially water insoluble and not permanently emulsified, remain dispersed and do not separate from the cloud or suspended plant materials in the liquid.

RATIOS OF INGREDIENTS

Although the weight ratio of polyglycerol ester to condiment in the composition of the invention is at least 0.7:1 by weight, preferably at least 1:1 by weight, and usually between about 2:1 and 10:1, the upper limit is determined only by reasons of practical economy, as there is theoretically no reason why much higher ratios cannot be employed. As far as ratios of polyglycerol ester to turmeric, these generally range between about 1.2:1 and about 2:1 whereas, if curcumin (the active coloring agent of turmeric) is employed, the ratio of polyglycerol ester to curcumin is usually at least 4:1. Where annatto extract, bixin, or norbixin is present in the composition of the invention, such condiment most usually is present in an amount of at least one percent, usually 1–20%, by weight of the composition, and this is generally true for all coloring materials, whether natural or synthetic, and whether present in the composition of the invention alone or together with a flavoring material.

Pure pigments by themselves, because they are usually solids by themselves are, if used alone, most easily handled at ratios of 4:1 to 10:1. If, because of their intense coloring power, more dilute dispersible pigments are desired, either further polyglycerol ester or other additaments may be used for dilution and standardization.

DETAILED DESCRIPTION OF THE INVENTION

The following Examples are given by way of illustration only and are not to be construed as limiting.

EXAMPLE 1

Pickles

A mixture of 25% oleoresin turmeric, 50% octaglycerol monooleate, and 25% propylene glycol is warmed to dissolve the turmeric. This may be stored indefinitely. The amount of propylene glycol may be increased or decreased, to standardize the color intensity. This mixture is then stirred into a cover brine, poured over the pickles to be colored, the pickles are pasteurized and ready for use. If desired, the turmeric may be debittered according to procedures known to the art.

EXAMPLE 2

Fresh Kosher Dills

A flavoring and coloring consisting of oleoresin turmeric 30%, and decaglycerol monocaprylate-caproate 70%, is prepared by warming and mixing the two materials. Oleoresins and essential oils of dill, 74%; garlic, 10%; ginger 3%; clove, 3%; bay, 1%; pimento, 2%; cassia, 2%; caraway, 3%; and capsicum, 2%, are mixed with an equal amount of decaglycerol monocaprylate-caproate. The turmeric is added to cover brine at the rate of 6 ml. per gallon, and the mixed flavoring at the rate of 5 ml. per gallon. Alternatively, the turmeric and mixed flavorings are combined and added together. The brine is pumped conventionally to filling machines, the capped pickle jars pasteurized, and within a few days the cloudiness disappears and the pickles become uniformly flavored and colored, and the brine becomes clear and colorless. If Polysorbate 80 had been used, color and flavor would have remained permanently emulsified in the brine.

EXAMPLE 3

Mixed flavoring not containing oleoresin turmeric. A flavoring suitable for use in uncolored foods, or to be added separately from the coloring, may be prepared by mixing about 50% of the octa- or deca-glycerol esters of Examples 1 and 2 and 50% flavoring. A flavoring which may be used in an application shown in Example 4 illustrates this versatility in an embodiment of the invention. It consists of:

|  | % |
| --- | --- |
| Oil of Clove | 15.25 |
| Oil of Cassia | 15.25 |
| Oil of Pimento | 15.25 |
| Oleoresin Celery | .60 |
| Oleoresin Ginger | 1.25 |
| Oil of Coriander | .60 |
| Oil of Nutmeg | 1.25 |
| Onion Concentrate | .55 |
| Octaglycerol monooleate | 50.00 |

EXAMPLE 4

Sweet Mixed Pickles—containing cucumbers, cauliflower, onions, and red bell peppers. The cured cucumber chunks are colored with oleoresin turmeric made according to Example 1, and added to the freshening water with agitation at a temperature of 125° F. A level of 2 ml. per gallon is commonplace. The cauliflower is similarly colored except that the level of turmeric is 5 to 6 mls. per gallon. The cured pearl onions and the peppers are not colored.

The freshening water is drained from the colored cucumbers and cauliflower and they are rinsed. Predetermined proportions of the four ingredients are filled into glass jars, covered with a sweet syrup containing 6 oz. of flavor(made according to Example 3) per 100 gallons of syrup and pasteurized. The onions remain white. If Polysorbate 80 had been used in this instance, the turmeric color would have migrated into the onions.

EXAMPLE 5

Iceburg Dill Chips

A flavor blend of 20% oleoresin turmeric, 30% oil of dillweed, and 50% decaglycerol monocaprylate-caproate was made. This was added to a cover brine containing 3% salt, 21.6 grain vinegar, and 46° Brix sugar syrup. The hot brine was used to fill jars of pickles, which were capped and pasteurized. The jars cleared up in a few days, with the flavor and color being uniformly distributed on the chips.

EXAMPLE 6

Ratio of polyglycerol esters to condiments. The functional range of the ratio of ester to condiment varies with the condiment, but for practical purposes the ratio will be one which enables the flavorist to use stock mixtures of various flavorings and colorings, and mix them together in a stable liquid form. The following is illustrative of the ranges using different flavorings and colorings.

A. Oil of Dillweed. This is chosen as a relatively non-polar flavoring, since commercial dillweed contains in excess of 50% of terpene hydrocarbons. A mixture of three parts dillweed and one part ester* will separate, whereas mixtures of one to one or more parts ester* will not separate.

B. Turmeric oleoresin. Sufficient polyglycerol ester must be present to keep the pigment, curcumin, from oiling or curding out. This is at least 4 parts ester* per part curcumin, or for an oleoresin turmeric containing 30% curcumin, 1.2 parts ester* per part oleoresin.

C. Other flavorings and oleoresins, e.g., oleoresin paprika or black pepper. Depending on polarity, they will behave between dillweed and turmeric. If they contain bodying agents, such as monoglycerides of fatty acids, or standardizing solvents, such as vegetable oil, which are non-polar, the ratio of polyglyceride may be increased. If something else which behaves as polar standardizing solvents, such as propylene glycol is used, the ratio of ester* may be reduced slightly.

* polyglycerol ester, e.g., of Examples 1 or 2

D. Pigments such as bixin and norbixin. Because of the high tinctorial power of these pigments, their concentration in condimental mixtures generally runs between 1 and 5%. If used without other flavorings, the polyglycerol ester may make up the balance of the mixture but, because of its cost, it is preferable to use propylene glycol to dilute a standard mixture of one part pigment to four to ten parts polyglycerol ester to the desired concentration of pigment.

EXAMPLE 7

Limitations on edible solvent/dispersing agent. Turmeric, being the most difficult oleoresin to disperse, was used as the basis of evaluating various types of dispersing agents. In addition to the problem of dispersion, the principal coloring pigment of turmeric, curcumin, is relatively insoluble in most edible solvents, and will precipitate readily. Furthermore, for the curcumin to effectively color the pickle, it must dissolve out of the oleoresin and into the aqueous brine, so that the dispersing agent must both act as a solvent for curcumin at high levels, to be economic, and yet permit the curcumin to partition out of the oleoresin into the water, to color pickles. One of the objects of this invention is to achieve both requirements.

In Table A, common edible dispersing agents/solvents are compared. It is clear that, aside from polyoxyethylene derivates, such as Polysorbate 80, only polyglycerols are effective in achieving these technical effects. They differ from the polyoxyethylene derivatives however, in that they disperse, rather than emulsify, the oleoresin.

It is the ability of these polyglycerols to dissolve curcumin, permit it to partition into water when dispersed, and yet not form a stable emulsion or clear emulsion (although the brine will clear in the end, when a substrate to be colored, such as pickles, is present), which permits attainment of some of the objectives of this invention.

Another objective of the invention is to have a stable, dispersible turmeric oleoresin which remains stable when other flavorings are present, so that a single flavoring and coloring system may be used. Table A shows that this is possible, using oil of dillweed, a relatively non-polar substance, as the reference material.

EXAMPLE 8

Dispersible annatto colors

Annatto, a naturally occuring seed, contains a carotenoid, bixin, which is the mono-methyl ester of norbixin, a carotenoid dicarboxylic acid. The present state of the art for the use of bixin is described in Kocher, U.S. Pat. No. 2,831,775, and Todd, U.S. Pat. No. 3,162,538.

The former describes improved processes for making norbixin, whereas the latter describes processes for utilization of bixin in oleogenous foods.

This invention offers advantageous composition and procedure for using both bixin and norbixin. If the norbixin of Kocher is to be used in a beverage, which normally has a pH below about 6, the norbixin will precipitate and fall out. The addition of Polysorbate 80 will tend to overcome this, but because norbixin is sold as highly alkaline solution (pH above about 12), and the Polysorbate 80 is an ester, the Polysorbate 80 is unstable in the norbixin preparation, saponifying and developing the off-flavors mentioned in the other sections of this disclosure when used in beverages, as well as losing its emulsification properties.

Because of this, in practice a preparation of bixin, propylene glycol, and Polysorbate 80 is made at a pH of about 9, which has a shelf life of about three months. The bixin of Todd, being suspended in a vegetable oil, is not suitable for dispersion in an aqueous medium.

The following examples illustrate the application of this invention to bixin and norbixin:

A. Bixin. Two grams of bixin was dissolved in 36 grams of propylene glycol and 36 grams of decaglycerol monocaprylatecaproate. No adjustment of pH was made. A few drops of this was stirred into a quart of tap water, and the bixin dispersed and remained dissolved in the water, giving a light orange shade. The same behavior occured in commercial soda water.

B. Norbixin is available commercially as a potassium salt in a 4% solution in potassium hydroxide (about 6%). Such a preparation, when added to soda water, will result in precipitation of the norbixin. It has been believed that this is due to the insolubility of bixin at an acid pH.

Norbixin, dissolved in mixtures of decaglycerol esters and propylene glycol and/or water, at a neutral pH, is now found to be soluble in seltzer water. For example, if a 4% norbixin solution in KOH is mixed with an equal part of decaglycerol caproate-caprylate and immediately neutralized with a mineral acid to a pH between 5.5 and 8.5, within which range the pigment is stable, the resulting liquid solution will give a clear orange-yellow solution when added dropwise, with stirring, to soda water. A substitution of bixin for norbixin produces the same result.

Although the foregoing Example shows that a ratio of 25:1 of polyglycerol ester to bixin or norbixin works, in actual practice, if proper equipment is available, water would be removed from the norbixin solution and the concentration of pigment would be higher; e.g.; up to 25% or 4:1 ester to pigment. Alternatively, propylene glycol or another additament would be used in place of a portion of the polyglycerol ester.

Other procedure for preparing such a soluble norbixin solution, such as dissolving the pure norbixin in the decaglycerol esters, will be immediately apparent to one skilled in the art, as well as how they can be applied in juices, particularly citrus.

These preparations of bixin and norbixin are also dispersible for use in coloring margarines, cheeses, breadings, oranges, and the like, and of course are compatible with other condiment compositions described in this specification.

EXAMPLE 9

Beverage colored with turmeric

One half ml. of turmeric coloring was made according to Example 1 and added to 200 ml. of seltzer water. The turmeric is readily dispersible. A yellow colored beverage with a slight cloud results.

EXAMPLE 10

Beverage colored with turmeric.

A 2% dextrose dispersion of the same coloring was made by blending 49 grams of dextrose with one gram of the turmeric composition of Example 1. A lemonade flavored Koolade ® was then made using one pack uncolored "lemonade flavor" Koolade ®, 3.5 grams of the turmeric dispersion, one cup sugar and two quarts water. The resulting beverage was an attractive yellow.

These Examples 9 and 10 show that turmeric oleoresin may be used to color beverages, either by introduction into the beverage as is, or by incorporation in a dry powder. Without the use of the polyglycerol ester to disperse the oleoresin, the turmeric would not have dispersed in either example.

Likewise, in the manner of the foregoing Examples, stable homogeneous flowing and/or coloring compositions are prepared and used to flavor and/or color foods and/or beverages, including such compositions comprising, as coloring agent or flavoring agent, the following:

Coloring Agents

Annatto extract, bixin, norbixin, lycopene, capsanthin, beta-apo-8 carotenal, and beta-carotene.

Flavoring Agents

Dill, garlic, ginger, clove, bay, pimento, cassia, caraway, capsicum, celery, coriander, nutmeg, paprika, black pepper, mustard, marjoram, thyme, sage, basil, spearmint, peppermint, lemon oil, orange oil, and tarragon.

It is to be understood that the invention is not to be limited to the exact details of operation or exact compounds, compositions, methods, or procedures shown and described, as obvious modifications and equivalents will be apparent to one skilled in the art.

TABLE I

Comparison of advantages and disadvantages of seasoning systems for brined foods.

|  | POLYSORBATE 80 | DRY DISPERSIONS | GUM | SPRAY DRY | POLYGLYCEROL ESTER SYSTEM OF THE PRESENT INVENTION |
|---|---|---|---|---|---|
| compatible with turmeric | x |  |  |  | x |
| no foam problem |  | x | x | x | x |
| no off flavors |  | x | x | x | x |
| no oxidation of condiment in food |  |  | x | x | x |
| full flavor utilization |  |  | x |  | x |
| condiment stores indefinitely |  |  |  |  | x |
| compatible with ingredients - of normal flavoring | usually |  |  |  | x |
| - of coloring | x |  |  |  | x |
| easy to use | x |  |  |  | x |

Code:
x = advantage

TABLE A

Comparability of Edible Dispersing Agents

| Dispersing Agent(s) | Curcumin Solubility | Dispersibility In Brine | Compatible With Oil of Dillweed |
|---|---|---|---|
| di, tri, and tetra- glycerol mono-esters of mixed fatty acids | precipitates | very poor | yes |
| mono-glyceride mono-acetate | precipitates | very poor | yes |
| mixed fatty acids monoglycerides | slight precipitate | very poor | yes |
| monoglyceride lactic acid esters | very precipitates | yes poor |  |
| glycerol monooleate | precipitates poor | very | yes |
| diacetyl tartaric ester of mono and di glycerides | precipitates | poor | yes |
| hydroxylated lecithin | precipitates | very poor | yes |
| 50:50 mixture of above two | slight precipitate | very poor | yes |
| Polysorbate 80 | yes | excellent | yes |
| octaglycerol monooleate | soluble | excellent | yes |
| decaglycerol monocaproate, caprylare | soluble | excellent | yes |
| triglycerol monooleate | separates above 5% curcumin | marginally acceptable | yes |
| hexaglycerol stearate | separates above 5% curcumin | acceptable | yes |

We claim:

1. A homogeneous liquid condimental composition, useful in flavoring or coloring foods and beverages, which is dispersible in brine or syrup containing solid food substrate with development of a haze, but which upon standing becomes a part of the flavoring or coloring of said food substrate present in said brine or syrup, with resulting clearing of color and haze from said brine or syrup, consisting essentially of (1) at least one condiment selected from an edible flavoring and an edible coloring and (2) a polyglycerol ester of a fatty acid, said polyglycerol having at least three glycerol units, the weight ratio of (2) to (1) in the said composition being at least 0.7:1.

2. Composition of claim 1, wherein the polyglycerol has at least six glycerol units.

3. Composition of claim 1, wherein the weight ratio of (2) to (1) is at least 1:1.

4. Composition of claim 1, wherein the weight ratio of (2) to (1) is between about 2:1 and 10:1.

5. Composition of claim 1, wherein the condiment (1) is selected from (a) oleoresin turmeric and (b) curcumin.

6. Composition of claim 1, wherein the condiment (1) is oleoresin turmeric and the weight ratio of (2) to (1) is at least about 1:1.

7. Composition of claim 1, wherein the condiment (1) is curcumin and the weight ratio of (2) to (1) is at least about 4:1.

8. Composition of claim 6, wherein the condiment (1) also includes an edible flavoring.

9. Composition of claim 7, wherein the condiment (1) also includes an edible flavoring.

10. Composition of claim 1, wherein the edible coloring is selected from the group consisting of annatto extract, bixin, norbixin, lycopene, capsanthin, beta-apo-8 carotenal, and betacarotene.

11. Composition of claim 4, wherein the condiment (1) also includes an edible flavoring.

12. Composition of claim 1, wherein the condiment (1) is an edible flavoring.

13. Composition of claim 4, wherein the condiment (1) is an edible flavoring.

14. Composition of claim 12, wherein the edible flavoring is a spice oleoresin or an essential oil.

15. Composition of claim 13, wherein the edible flavoring is a spice oleoresin or an essential oil.

16. Composition of claim 12, wherein the edible flavoring is selected from the group consisting of dill, garlic, ginger, clove, bay, pimento, cassia, caraway, capsicum, celery, coriander, nutmeg, paprika, black pepper, mustard, marjoram, thyme, sage, basil, spearmint, peppermint, lemon oil, orange oil, and tarragon.

17. Composition of claim 13, wherein the edible flavoring is selected from the group consisting of dill, garlic, ginger, clove, bay, pimento, cassia, caraway, capsicum, celery, coriander, nutmeg, paprika, black pepper, mustard, marjoram, thyme, sage, basil, spearmint, peppermint, lemon oil, orange oil and tarragon.

18. Composition of claim 2, wherein bixin or norbixin is present at a level of one percent or more of the composition, the composition is at a pH between about 5.5 and 8.5 at which the bixin or norbixin is stable, and the polyglycerol ester is present in a ratio of at least about four parts per part of bixin or norbixin.

19. Composition of claim 1, wherein propylene glycol is included as a diluent.

20. A food or beverage product, having a liquid phase of brine or syrup containing solid food substrate therein, which product including substrate is seasoned, flavored, or colored with a condimental composition which is dispersible in the liquid phase thereof with development of a haze, but which upon standing becomes a part of the flavoring or coloring of the food substrate, with resulting clearing of color and haze from said liquid phase, said condimental composition consisting essentially of (1) at least one condiment selected from an edible flavoring and an edible coloring and (2) a polyglycerol ester of a fatty acid, said polyglycerol having at least three glycerol units, the weight ratio of (2) to (1) in the said composition being at least 0.7:1.

21. Composition of claim 20, wherein the polyglycerol has at least six glycerol units.

22. Composition of claim 20, wherein the weight ratio of (2) to (1) is at least 1:1.

23. Composition of claim 20, wherein the weight ratio of (2) to (1) is between about 2:1 and 10:1.

24. Composition of claim 20, wherein the condiment (1) is selected from (a) oleoresin turmeric and (b) curcumin.

25. Composition of claim 20, wherein the condiment (1) is oleoresin turmeric and the weight ratio of (2) to (11) is at least about 1:1.

26. Composition of claim 20, wherein the condiment (1) is curcumin and the weight ratio of (2) to (1) is at least about 4:1.

27. Composition of claim 25, wherein the condiment (1) also includes an edible flavoring.

28. Composition of claim 26, wherein the condiment (1) also includes an edible flavoring.

29. Composition of claim 20, wherein the edible coloring is selected from the group consisting of annatto extract, bixin, norbixin, lycopene, capsanthin, beta-apo-8 carotenal, and betacarotene.

30. Composition of claim 23, wherein the condiment (1) also includes an edible flavoring.

31. Composition of claim 20, wherein the condiment (1) is an edible flavoring.

32. Composition of claim 23, wherein the condiment (1) is an edible flavoring.

33. Composition of claim 31, wherein the edible flavoring is a spice oleoresin or an essential oil.

34. Composition of claim 32, wherein the edible flavoring is a spice oleoresin or an essential oil.

35. Composition of claim 31, wherein the edible flavoring is selected from the group consisting of dill, garlic, ginger, clove, bay, pimento, cassia, caraway, capsicum, celery, coriander, nutmeg, paprika, black pepper, mustard, marjoram, thyme, sage, basil, spearmint, peppermint, lemon oil, orange oil, and tarragon.

36. Composition of claim 32, wherein the edible flavoring is selected from the group consisting of dill, garlic, ginger, clove, bay, pimento, cassia, caraway, capsicum, celery, coriander, nutmeg, paprika, black pepper, mustard, marjoram, thyme, sage, basil, spearmint, peppermint, lemon oil, orange oil and tarragon.

37. Composition of claim 21, wherein bixin or norbixin is present at a level of one percent or more of the composition, the composition is at a pH between about 5.5 and 8.5 at which the bixin or norbixin is stable, and the polyglycerol ester is present in a ratio of at least about four parts per part of bixin or norbixin.

38. Composition of claim 20, wherein propylene glycol is included as a diluent.

39. A method of flavoring or coloring a food or beverage product comprising a liquid phase of brine or syrup containing solid food substrate therein, comprising the steps of adding to said food or beverage product an effective flavoring or coloring amount of a homogeneous liquid condimental composition, useful in flavoring or coloring a food or beverage product including substrate, which is dispersible in said liquid phase with the development of a haze, but which upon standing becomes a part of the flavoring or coloring of said food substrate present in color and haze from said liquid phase, with resulting clearing of said liquid phase, consisting essentially of (1) at least one condiment selected from an edible flavoring and an edible coloring and (2) a polyglycerol ester of a fatty acid, said polyglycerol having at least three glycerol units, the weight ratio of (2) to (1) in the said composition being at least 0.7:1, dispersing said composition in the liquid phase of said food or beverage thereby coloring or flavoring same, and maintaining the liquid phase and solid food substrate in contact by allowing them to stand for a sufficient period to transfer said flavoring or coloring to said solid food substrate with concommitant clearing of color and haze from said liquid phase.

40. Method of claim 39, wherein the polyglycerol has at least six glycerol units.

41. Method of claim 39, wherein the weight ratio of (2) to (1) is at least 1:1.

42. Method of claim 39, wherein the weight ratio of (2) to (1) is between about 2:1 and 10:1.

43. Method of claim 39, wherein the condiment (1) is selected from (a) oleoresin turmeric and (b) curcumin.

44. Method of claim 39, wherein the condiment (1) is oleoresin turmeric and the weight ration of (2) to (1) is at least about 1:1.

45. Method of claim 39, wherein the condiment (1) is curcumin and the weight ratio of (2) to (1) is at least about 4:1.

46. Method of claim 44, wherein the condiment (1) also includes an edible flavoring.

47. Method of claim 45, wherein the condiment (1) also includes an edible flavoring.

48. Method of claim 39, wherein the edible coloring is selected from the group consisting of annatto extract, bixin, norbixin, lycopene, capsanthin, beta-apo-8 carotenal, and beta-carotene.

49. Method of claim 42, wherein the condiment (1) also includes an edible flavoring.

50. Method of claim 39, wherein the condiment (1) is an edible flavoring.

51. Method of claim 42, wherein the condiment (1) is an edible flavoring.

52. Method of claim 50, wherein the edible flavoring is a spice oleoresin or an essential oil.

53. Method of claim 51, wherein the edible flavoring is a spice oleoresin or an essential oil.

54. Method of claim 50, wherein the edible flavoring is selected from the group consisting of dill, garlic, ginger, clove, bay, pimento, cassia, caraway, capsicum, celery, coriander, nutmeg, paprika, black pepper, mustard, marjoram, thyme, sage, basil, spearmint, peppermint, lemon oil, orange oil, and tarragon.

55. Method of claim 51, wherein the edible flavoring is selected from the group consisting of dill, garlic, ginger, clove, bay, pimento, cassia, caraway, capsicum, celery, coriander, nutmeg, paprika, black pepper, mustard, marjoram, thyme, sage, basil, spearmint, peppermint, lemon oil, orange oil and tarragon.

56. Method of claim 40, wherein bixin or norbixin is present at a level of one percent or more of the composition, the composition is at a pH between about 5.5 and 8.5 at which the bixin or norbixin is stable, and the polyglycerol ester is present in a ratio of at least about four parts per part of bixin or norbixin.

57. Method of claim 39, wherein propylene glycol is included as a diluent.

* * * * *

UNITED STATES PATENT AND TRADEMARK OFFICE
CERTIFICATE OF CORRECTION

PATENT NO. : 4,315,947

DATED : February 16, 1982

INVENTOR(S) : Paul H. Todd, Jr. and Howard E. Haley

PAGE 1 of 2

It is certified that error appears in the above—identified patent and that said Letters Patent is hereby corrected as shown below:

Col. 1, line 59; "or" should read -- of --
Col. 3, line 62; "1981" should read -- 1980 -- Response and Amendment dated July 13, 1981, page 1.
Col. 4, line 14; "orallyacceptable" should read -- orally-acceptable --
Col. 5, line 37; "curcumic" should read -- curcumin --
Col. 6, line 25; "mixture" should read -- mixtures --
Col. 6, line 42; "killing" should read -- filling --
Col. 9, line 6; "standarizing" should read -- standardizing --
Col. 10, line 3; after "as" insert -- a --
Col. 11, line 18; "flowing" should read -- flavoring --
Col. 11, TABLE A, last line; "di, tri, and tetra-" should not be separated from the rest of the table.
Col. 12, seventh line under second column; delete "very"
Col. 12, seventh line under third column; delete "yes" and insert -- very --
Col. 12, seventh line under fourth column; insert -- yes --
Col. 12, tenth line under second column; delete "poor"
Col. 12, tenth line under third column; insert -- poor --
Col. 12, twenty-third line under first column; "caprylare" should read -- caprylate --
Col. 14, line 11; "(11" should read -- (1) -- Response and Amendment dated February 13, 1981, page 2, claim 26, line 2.

UNITED STATES PATENT AND TRADEMARK OFFICE
CERTIFICATE OF CORRECTION

PATENT NO. : 4,315,947

DATED : February 16, 1982

INVENTOR(S) : Paul H. Todd, Jr. and Howard E. Haley

It is certified that error appears in the above—identified patent and that said Letters Patent is hereby corrected as shown below:

Col. 14, line 12; delete ")"
Col. 14, line 23; "betacarotene" should read — beta-carotene — Response and Amendment dated February 13, 1981, page 3, claim 30, lines 3 & 4.

Signed and Sealed this

Twentieth Day of July 1982

[SEAL]

Attest:

GERALD J. MOSSINGHOFF

Attesting Officer Commissioner of Patents and Trademarks